United States Patent [19]

Bogan, Jr. et al.

[11] Patent Number: 5,723,083
[45] Date of Patent: Mar. 3, 1998

[54] METHOD FOR FORMING PARTS FROM INORGANIC PARTICULATE MATERIAL

[75] Inventors: Leonard Edward Bogan, Jr., Hatfield; Richard Anthony Einhorn, Langhorne, both of Pa.

[73] Assignee: Rohm and Haas Company, Philadelphia, Pa.

[21] Appl. No.: 707,882

[22] Filed: Sep. 9, 1996

Related U.S. Application Data

[60] Provisional application No. 60/004,498 Sep. 29, 1995.

[51] Int. Cl.$^6$ .................................................. C04B 33/32
[52] U.S. Cl. ........................... 264/177.11; 264/328.2; 264/344; 264/638; 264/639; 264/645; 264/669; 264/670; 419/36; 419/37; 419/10
[58] Field of Search ........................ 264/63, 344, 177.11, 264/328.2, 638, 639, 645, 669, 670; 419/36, 37, 10

[56] References Cited

U.S. PATENT DOCUMENTS

| | | |
|---|---|---|
| 3,346,680 | 10/1967 | Bush .......................... 264/63 |
| 4,996,015 | 2/1991 | Yoshimoto et al. . |
| 5,059,388 | 10/1991 | Kihara et al. .................. 264/344 |
| 5,087,594 | 2/1992 | Kato et al. . |
| 5,366,679 | 11/1994 | Streicher . |
| 5,380,179 | 1/1995 | Nishimura et al. . |
| 5,380,476 | 1/1995 | Matsushita ..................... 264/344 |
| 5,439,964 | 8/1995 | Ohst et al. . |
| 5,602,197 | 2/1997 | Johnson et al. ................. 264/63 |

FOREIGN PATENT DOCUMENTS

| | | |
|---|---|---|
| 688 746 A1 | 5/1995 | European Pat. Off. . |
| 5-196201 | 8/1993 | Japan . |
| 5-238601 | 9/1993 | Japan . |
| WO 92/22509 | 12/1992 | WIPO . |

*Primary Examiner*—James Derrington
*Attorney, Agent, or Firm*—David T. Banchik

[57] ABSTRACT

A method for forming parts from inorganic particulate materials is diclosed. The method utilizes a two-component binder composition which is removable at a faster rate than conventional binder compositions, thereby reducing the formation of voids and cracks that occur during binder removal. No toxic materials are required and the method does not rely on solvents. The method may be used with ceramics, metals, and cermets.

14 Claims, No Drawings

METHOD FOR FORMING PARTS FROM INORGANIC PARTICULATE MATERIAL

This is a nonprovisional application of prior pending provisional application Ser. No. 60/004,498, filed Sep. 29, 1995.

The present invention relates to a method for forming parts from inorganic particulate material. More particularly, the present invention relates to a method for forming parts from inorganic particulate material, by use of a polymeric binder which may be removed from the part after formation by heating. The method includes formation of parts by injection molding and by extrusion.

Injection molding is a useful method for forming parts from particulate material with little or no machining following formation. This is particularly desirable for forming parts from ceramic powders, because ceramic materials can be difficult to machine.

Extrusion is a process used in the ceramics and plastics industries to produce parts having a constant cross-section. Plastic extrusion typically involves conveying polymeric material along a single or twin screw within a barrel of an extruder while heat is applied to melt the polymer and impart plasticity. Conversely, in ceramics processing, extrusion typically does not involve heating of the material. Ceramic materials are processed in powder form. Plasticity in a ceramic material is achieved by adding water and a binder to the ceramic powder.

Binders are generally required for the processing of ceramic and other inorganic particulate materials. However, following the processing of the material to form a part, the binder must be removed. Removal of binders is typically accomplished by heating the part, a process known as "thermal debinding", or by immersion of the part in one or more solvents, a process known as "solvent debinding". The techniques may also be used in combination.

During thermal debinding, binder materials vaporize. If this vaporization occurs too rapidly, bubbles and cracks can form in the part. Therefore, the rate at which thermal debinding may be carried out is limited. Removal of the binder at a rate that does not damage the part may take one or more days of heating. Solvent debinding can be costly in terms of solvents and equipment, since many of the preferred solvents are materials which require special handling and disposal.

Other methods for binder removal include wicking and catalytic debinding. Wicking involves packing of the part in a powder and heating the part and the surrounding powder. The binder material is wicked into the powder. This method can work more quickly than conventional thermal debinding but is also labor intensive.

Catalytic debinding is the most rapid of the standard debinding methods, and is described in detail in U.S. Pat. No. 5,145,900. The problems with catalytic debinding are that it requires the use of specialized equipment for debinding and it involves handling hazardous materials. The catalytic materials are typically strong acids, such as nitric acid and oxalic acid, and produce formaldehyde as a decomposition product.

Japanese patent application 07-097271A discloses a binder composition comprising a paraffin wax and an acrylate resin, for use in injection molding of ceramic powder. The binder is thermally removed. However, when the binder is removed by heating at a rate of 30° C. per hour, cracks and blisters formed.

The method of the present invention provides a more rapid thermal debinding rate than conventional thermal debinding processes, using standard equipment, without the added steps required in wicking or solvent debinding, without the use of noxious catalytic materials, and with the reduction or elimination of formaldehyde production. A further advantage of the method of the present invention is that it allows for control over the debinding rate by selection of the composition of the binder. This control minimizes any adverse affects of the binder removal process on the shape or the dimensions of the part, including crack and bubble formation.

Parts formed by extrusion or injection molding of ceramic materials are "green parts". Green parts are further processed by firing, according to methods known to those skilled in the art. See, for example, James S. Reed, *Principles of Ceramics Processing*, John Wiley & Sons (1995). Firing involves heating of the part to a temperature sufficient to "sinter", or consolidate, the part. During firing, any residual binder is removed. Parts formed according to the method of the present invention may be fired according to methods known in the art.

According to a first aspect of this invention, there is provided a method for forming a part from one or more particulate inorganic materials comprising:

a) forming a binder composition by admixing a primary binder and a secondary binder;

wherein said primary binder has a vapor pressure of at least 1 torr (133.3 Pa) at the decomposition temperature of the secondary binder;

b) forming a feedstock by mixing said binder composition with one or more particulate materials at a temperature above the melting point of said binder composition;

c) forming a part from said feedstock by injection molding; and d) heating the part at a rate of from 0.5° C. per minute to 10° C. per minute.

A second aspect of the present invention is a part formed according the disclosed method.

Another aspect of the present invention is a method for forming an extruded part from inorganic particulate material, comprising:

a) forming a binder composition by admixing a primary binder and a secondary binder, wherein said primary binder has a vapor pressure of at least 1 torr (133.3 Pa) at the decomposition temperature of the secondary binder;

b) forming a feedstock by mixing said binder composition with one or more particulate materials at a temperature above the melting point of said binder composition;

c) feeding said feedstock into an extruder comprising a screw and a die;

d) forming an extrudate by heating said feedstock at a temperature sufficient to liquefy said feedstock and forcing said feedstock through the die;

e) allowing said extrudate to harden at room temperature; and f) heating the part at a rate of from 0.5° C. per minute to 10° C. per minute.

The binder composition used in the method of the present invention is formed from a primary binder and a secondary binder. The primary binder and secondary binder have different vapor pressures, which allows them to be removed from the part sequentially rather than simultaneously. It is believed that the removal of the primary binder creates pathways through which the secondary binder may be removed from the part without creating cracks and bubbles in the part. The binders are chosen so that the secondary binder remains in the part for as long as possible during the removal of the primary binder, in order to maintain the shape of the part. The primary binder has a vapor pressure of at least 1 torr (133.3 PA) at the decomposition temperature of the secondary binder. For optimal binder removal, at the decomposition temperature of the secondary binder, the primary binder preferably has a vapor pressure of from 10 to 1000 torr (1.3–130 kiloPascal, kPa), more preferably from 100 to 600 torr (13–78 kPa), and most preferably from 300 to 400 torr (39–52 kPa) at the decomposition temperature of the secondary binder. Too high or to low a vapor pressure may result in increased time required for debinding. The primary binder preferably dissolves the secondary binder at typical molding temperatures of from about 80° C. to 200° C., but forms a separate phase from the secondary binder at temperatures above 10° C. and below about 80° C.

The primary binder used in the method of this invention may have two components. When the primary binder has two components, the first component is preferably a solid at room temperature. The first component is a solid at room temperature of about 25° C. The first component is independently selected from diols and polyols having a molecular weight less than about 300, such as, for example, trimethylolpropane, di-trimethylolpropane, neopentyl glycol, pentaerythritol, and dipentaerythritol. The ratio of the second component of the primary binder to the first component of the primary binder is preferably at least 1:20, and more preferably at least 1:10.

The second component of the primary binder used in the method of this invention is independently selected from the group consisting of ($C_2$–$C_{20}$) 1,2-diols; ($C_3$–$C_{20}$) 1,2-polyols; ($C_3$–$C_{20}$) 1,3-diols; ($C_4$–$C_{20}$) 1,3-polyols; ($C_2$–$C_6$) alkylene oxides; polymers comprising as polymerized units ($C_2$–$C_6$) alkylene oxides, ($C_2$–$C_6$) alkylene oxide oligomers; ($C_1$–$C_4$) ethers of polymers comprising as polymerized units ($C_2$–$C_6$) alkylene oxides; ($C_1$–$C_4$) ethers of ($C_2$–$C_6$) alkylene oxide oligomers; poly(hydroxyalkylene carbonate)s; and polyvinyl alcohol.

Examples of 1,3-diols and polyols include: 1,3-propanediol; 1,3-butanediol; 2-methyl-1,3-propanediol; neopentyl glycol; 2,2-diethylpropanediol; 2-ethyl-2-methylpropanediol; 2-methyl-2-propylpropanediol; 2-ethyl-2-butylpropanediol; 2,4,4-trimethyt-3,5-pentanediol; 2-ethyl-1,3-hexanediol; trimethylolpropane; di-trimethylolpropane; pentaerythritol; di-pentaerythritol:

Also useful are derivatives of 1,3-diols including cyclic trimethylolpropane formal, and trimethylolpropane allyl ethers.

Examples of 1,2-diols include: ethylene glycol; propylene glycol; 2,2-dimethyl-3,4-butanediol; and pinacol.

Examples of alkylene oxides include ethylene oxide and propylene oxide.

Examples of polymers comprising as polymerized units ($C_2$–$C_6$) alkylene oxides, also known as polyalkylene oxides, include: homopolymers and copolymers of ethylene oxide and polymers of propylene oxide.

Examples of poly(hydroxyalkylene carbonate)s include: poly[[oxycarbonyl(oxy))]-2,3-O-isopropyldienethreityl] and poly||(oxycarbonyl(oxy))]-1,4-threityl].

Oligomers of alkylene oxides include oligomers of ethylene glycol having a molecular weight of no more than 2000; and oligomers of propylene glycol having a molecular weight of no more than 2000. Examples of these oligomers and ethers thereof, useful in the method of the present invention, include dipropylene glycol; dipropylene glycol methyl ether; tripropylene glycol; tripropylene glycol methyl ether; triethylene glycol; triethylene glycol methyl ether; triethylene glycol dimethyl ether; tetraethylene glycol; tetraethylene glycol methyl ether; and tetraethylene glycol dimethyl ether.

The secondary binder used in the method of the present invention may be any polymer known in the art for use in injection molding. These polymers may be thermoplastic polymers or thermoset polymers. Examples are acrylic and methacrylic homopolymers and copolymers, polystyrene and its copolymers, poly(vinyl acetate) and its copolymers; and poly(2-ethyl-2-oxazoline). Particularly useful are homopolymers and copolymers comprising as polymerized units: methyl methacrylate, ethyl acrylate, isobutyl methacrylate, tertiary butylaminoethyl methacrylate, acrylic acid, and methacrylic acid.

In the method of the present invention, the weight ratio of the total primary binder material to the secondary binder material in the binder composition is preferably 10:1 or less, more preferably 5:1 or less, most preferably 3:1 or less.

The method of the present invention is useful with particulate materials including ceramics, metals, and cermets, which are composites of ceramic and metal. Ceramic materials for which this method is useful include oxide ceramics and non-oxide ceramics. Mixtures of ceramics may be used.

Oxide ceramics include alumina, titania, silica, porcelain, barium titanate, clay, sialon, zirconia; and oxides of tin, lead, ruthenium, tungsten, yttrium, nickel, magnesium, and calcium. Non oxide ceramics include silicon nitride, silicon carbide, aluminum nitride, zirconium nitride, zirconium bromide, titanium nitride, titanium carbide, titanium boride, boron nitride, boron carbide, tungsten carbide, tungsten boride.

Cermets include nickel-titanium carbide, silicon-silicon carbide, aluminum oxide-chromium, tungsten carbide-cobalt.

Metals for which the present method is useful include: iron; steel, including carbon steels, stainless steels, and precipitation hardened steels; nickel, tungsten. The amount of particulate material used to form a part in the method of the present material is at least 40 volume percent of the total mixture, preferably from 50 to 80, and more preferably from 55 to 70 volume percent.

According to the method of the present ;invention, the materials may be mixed by conventional methods used for mixing ceramic and other inorganic particulate materials. For example, a pressure kneader such as Haake torque rheometer may be used to mix the binder composition with one or more inorganic particulate materials. The mixing of the binder composition with the inorganic particulate material is done at a temperature above the melting point of the binder composition. Before mixing the binder composition with the inorganic particulate material, the binder components may be mixed together, for example in a kettle. Mixing of the binder components is preferably done at a temperature at which the mixture is a fluid. Alternatively, all components of the binder and the inorganic particulate material may be admixed simultaneously.

Other optional components may be added to the binder composition, as is known to those skilled in the art. Examples of optional materials include lubricants and dispersants. These materials are known in the art and are typically used at levels of from 0.1 percent to 10 percent by weight based on the weight of the inorganic particulate material. Typical materials used as lubricants and dispersants include stearic acid, oleic acid, palmitic acid, zinc stearate, calcium stearate, lithium stearate, ethylene bisstearaminde, and polyethylene.

The mixture of binder composition and particulate material may be used as a feedstock to form a part by injection molding. The temperature and pressure required in the injection molding are determined by the composition of the feedstock and by the shape of the part which is to be formed. Following the formation of the desired shape by molding, the shaped part is allowed to cool until the particulate material and the binder composition have hardened. The time required for hardening depends upon the composition of the feedstock, the shape and size of the part, and the molding conditions. Typically, hardening requires about one minute or less.

When the part has cooled and hardened, the binder is removed. The binder removal is carried out in two steps. The procedure, or "schedule", depends upon the composition of the feedstock, the size and shape of the part, and the oven used for heating. In a typical debinding schedule according to the method of the present invention, a part is heated at a rate of from about 1° C./minute to about 5° C./minute, to a temperature of about 110° to 200° C., held at that temperature for 30 to 180 minutes, then heated at a rate of about 1° C./minute to a temperature of about 250° C. and held at that temperature for from about 30 minutes to about 180 minutes. The heating rate in either the first or second step, or in both steps, may range up to about 10° C., depending upon the binder composition, the inorganic particulate material, and the dimensions of the part. For some compositions it may be desirable to heat the part at a rate as slow as 0.5° C. per minute in one or both of the heating steps. Generally, following the debinding, the weight of the part has been reduced by at least 90 percent of the initial weight of primary binder. The 90 percent reduction typically occurs within about 12 hours or less, in some cases about 7 hours or less.

Alternatively, the feedstock may be used to form parts from inorganic particulate material by extrusion. Standard extruders known in the art may be used. The feedstock is prepared as described above, and fed into an extruder. The residence time in the extruder is determined by the screw speed and the screw dimensions. An extrudate is produced, which is allowed to harden at room temperature. The extrudate may optionally be cut or machined to form parts. Following formation of extruded parts, debinding may be carried out as described herein for debinding of injection molded parts. Machining of the part may also optionally be done following debinding. Parts formed by extrusion according to the method of the present invention are stronger than those prepared by extrusion of ceramic and metal parts using methylcellulose and water to form a binder.

The following examples are provided as an illustration of the method of the present invention.

EXAMPLE 1

Injection molding of alumina parts using trimethylolpropane/ propylene glycol trimer/poly(methyl methacrylate) binder A binder was prepared as follows. Trimethylolpropane (TMP), (435.1 g), was added to propylene glycol trimer (435.3 g) at 55° C. and stirred to dissolve. The solution was heated to 160° C. and poly(methylmethacrylate), PMMA (435.3 g, Rohm and Haas HT-100) was added with stirring over three hours. After all the PMMA had dissolved, stearic acid (68.7 g) was added. When the stearic acid had dissolved, the binder solution was poured into aluminum pans to cool.

After the solution had cooled, a feedstock was formed by processing on a torque rheometer ((Haake Mess-Technik GmbH u. Co.) Rheocord 900 series, "Haake Rheocord"). The Haake Rheocord was equipped with "roller type rotors (model no. 557-1034). The unit was pre-heated to 120° C. and the rotors were started at 200 rpm. Alumina (648.8 g; ALCOA 3000) and binder as prepared above (88.8 g) were gradually added alternately, a liter at a time, over about 5 minutes. The alumina and binder were mixed for 30 minutes. The mixture was discharged from the rheometer. After the mixture was cooled to room temperature, the particle size was reduced by processing in a lab scale grinding mill (Staub Co. Model 4E) to prepare for injection molding.

The feedstock was used to mold standard tensile bars on an Arburg model 270C-300-80 injection molding machine under the following conditions: melt temperature 120°–160° C. mold temperature 35° C., injection speed 25–50 mm/s, screw speed 200 rpm, back pressure 10 bar (1 kPa)[1]. The resulting injection pressure was 280 bar (28 kPa) and the cavity pressure was 100 bar (10 kPa).

Pressure was measured in bar. Conversion factor used: 1 bar=100,000 Pa. 1 Pa is equal to 1 Newton/m².

The tensile bars underwent debinding in a forced-air oven by heating at 1° C./min. to 110° C., holding at 110° C. for 90 minutes, then cooling. The bars were sintered by heating at 5° C./min. to 1700° C. The sintered bars exhibited no bubbles or cracks.

EXAMPLE 2

Injection molding of alumina parts using trimethylolpropane/tetraglyme/poly(methylmethacrylate) binder TMP (899.9 g) was dissolved in tetraglyme (TG), (100.1 g), at 80° C. with stirring. The solution was heated to 160° C. and poly(methylmethacrylate), PMMA (500.0 g, Rohm and Haas HT-100) was added with stirring over three hours. After all the PMMA had dissolved, stearic acid (79.0 g) was added. When the stearic acid had dissolved, the solution was poured into aluminum pans to cool.

After the solution had cooled, a feedstock was formed by processing on a torque rheometer ((Haake Mess-Technik GmbH u. Co.) Rheocord 900 series, "Haake Rheocord"). The Haake Rheocord was equipped with "roller type rotors (model no. 557-1034). The unit was pre-heated to 120° C. and the rotors were started at 200 rpm. Alumina (648.8 g; ALCOA 3000) and binder as prepared above (88.8 g) were gradually added alternately, a liter at a time, over about 5 minutes. The alumina and binder were mixed for 30 minutes. The mixture was discharged from the rheometer. After the mixture was cooled to room temperature, the particle size was reduced by processing in a lab scale grinding mill (Staub Co. Model 4E) to prepare for injection molding.

EXAMPLE 3

Extrusion of alumina using trimethylolpropane/tetraglyme/poly(methyl methacrylate) binder A feedstock was prepared from 63 volume percent alumina and a binder which was 2:1 (TMP/TG):PMMA (Rohm and Haas HT-100). The weight ratio of TMP:TG was 9:1. The feedstock was fed into a 22 mm single screw extruder having a 25:1 length/diameter (L/D) ratio. The screw used a 2.5:1 compression ratio. The extruder employed four independent heating zones and the temperatures of the zones were: 120° C./120° C./125° C./130° C. The residence time in the extruder was 2 minutes. Two millimeter rods were produced. Similarly, 20 millimeter rods were produced using the same feedstock and conditions. The extrudate emerged from the die in a semi-rigid state and hardened within a few seconds.

EXAMPLE 4

Extrusion of stainless steel using trimethylolpropane/tetraglyme/poly(methyl methacrylate) binder A feedstock was prepared from 63 v/o 316L stainless steel and a binder which was 2:1 (TMP/TG):PMMA (Rohm and Haas HT-100). The weight ratio of TMP:TG was 9:1. The feedstock was fed into a 22 mm single screw extruder having a 25:1 length/diameter (L/D) ratio. The extruder employed four independent heating zones and the temperatures of the zones were: 120° C./120° C./125° C./130° C. The residence time in the extruder was 2 minutes. Two millimeter rods were produced. Similarly, 20 millimeter rods were produced using the same feedstock and conditions. The extrudate emerged from the die in a semi-rigid state and hardened within a few seconds.

What is claimed is:

1. A method for forming a part from one or more particulate inorganic materials comprising:
   a) forming a binder composition by admixing a primary binder and a secondary binder; wherein said primary binder comprises a first component selected from the group consisting of trimethylolpropane, di-trimethylolpropane, neopentyl glycol, pentaerythritol, and dipentaerythritol;
   b) forming a feedstock by mixing said binder composition with one or more particulate materials at a temperature above the melting point of said binder composition;
   c) forming a part from said feedstock by injection molding; and
   d) removing said binder composition from said part by heating the part at a rate of from 0.5° C. per minute to 10 ° C. per minute.

2. The method of claim 1 wherein the step of forming a binder composition further comprises adding one or more materials selected from the group consisting of lubricants and dispersants.

3. The method of claim 1 wherein the primary binder further comprises a second component independently selected from the group consisting of: ($C_2$–$C_{20}$) 1,2-diols; ($C_3$–$C_{20}$) 1,2-polyols; ($C_3$–$C_{20}$) 1,3-diols; ($C_4$–$C_{20}$) 1,3-polyols; ($C_2$–$C_6$) alkylene oxides; polymers comprising as polymerized units ($C_2$–$C_6$) alkylene oxides, ($C_2$–$C_6$) alkylene oxide oligomers; ($C_1$–$C_4$) ethers of polymers comprising as polymerized units ($C_2$–$C_6$) alkylene oxides; ($C_1$–$C_4$) ethers of ($C_2$–$C_6$) alkylene oxide oligomers; poly (hydroxyalkylene carbonate)s; and polyvinyl alcohol.

4. The method of claim 1 wherein the primary binder further comprises a second component independently selected from the group consisting of: 1,3-propanediol; 1,3-butanediol; 2-methyl-1,3-propanediol; neopentyl glycol; 2,2-diethylpropanediol; 2-ethyl-2-methylpropanediol; 2-methyl-2-propylpropanediol; 2-ethyl-2-butylpropanediol; 2,4-dimethyl-2,4-butanediol; 2,4,4-trimethyl-3,5-pentanediol; 2-ethyl-1,3-hexanediol; 3,3-dimethyl-1,2-butanediol; pinacol; 1,4-cyclohexanediol; trimethylolpropane; di-trimethylolpropane; pentaerythritol; di-pentaerythritol; cyclic trimethylolpropane formal; trimethylolpropane allyl ethers; dipropylene glycol; dipropylene glycol methyl ether; tripropylene glycol; tripropylene glycol methyl ether; triethylene glycol; triethylene glycol methyl ether; triethylene glycol dimethyl ether; tetraethylene glycol; tetraethylene glycol methyl ether; and tetraethylene glycol dimethyl ether.

5. The method of claim 1 wherein the secondary binder is selected from the group consisting of: acrylic and methacrylic homopolymers and copolymers, polystyrene, poly (vinyl acetate), and poly(2-ethyl-2-oxazoline).

6. The method of claim 1 wherein the secondary binder is selected from the group consisting of: polymers comprising as polymerized units: methyl methacrylate, ethyl acrylate, isobutyl methacrylate, tertiary butylaminoethyl methacrylate acrylic acid, and methacrylic acid.

7. The method of claim 1 wherein the weight ratio of the total primary binder material to the secondary binder material in the binder composition is 10:1 or less.

8. The method of claim 1 wherein the amount of particulate material used to form a part in the method of the present invention is at least 40 volume percent of the total mixture.

9. The method of claim 1 wherein the inorganic particulate material is selected from the group consisting of ceramics, metals and cermets.

10. The method of claim 1 wherein the heating in step (d) is carried out within 12 hours.

11. The method of claim 1 further comprising in step (d) holding at a maximum temperature of about 250° C. for less than 180 minutes.

12. A method for forming an extruded part from inorganic particulate material, comprising:
   a) forming a binder composition by admixing a primary binder and a secondary binder, wherein said primary binder comprises a first component selected from the group consisting of trimethylolpropane, di-trimethylolpropane, neopentyl glycol, pentaerythritol and dipentaerythritol;
   b) forming a feedstock by mixing said binder composition with one or more particulate materials at a temperature above the melting point of said binder composition;
   c) feeding said feedstock into an extruder comprising a screw and a die;
   d) forming an extrudate by heating said feedstock at a temperature sufficient to liquefy said feedstock and forcing said feedstock through the die;
   e) allowing said extrudate to harden at room temperature; and
   f) removing said binder composition from said part by heating the part at a rate of from 1° C. per minute to 10° C. per minute.

13. The method of claim 12 wherein the primary binder further comprises a second component independently selected from the group consisting of: ($C_2$–$C_{20}$) 1,2-diols; ($C_3$–$C_{20}$) 1,2-polyols; ($C_3$–$C_{20}$) 1,3-diols; ($C_4$–$C_{20}$) 1,3-polyols; ($C_2$–$C_6$) alkylene oxides; polymers comprising as polymerized units ($C_2$–$C_6$) alkylene oxides, ($C_2$–$C_6$) alkylene oxide oligomers; $C_1$–$C_4$) ethers of polymers comprising as polymerized units ($C_2$–$C_6$) alkylene oxides; $C_1$–$C_4$) ethers of ($C_2$–$C_6$) alkylene oxide oligomers; poly (hydroxyalkylene carbonate)s; and polyvinyl alcohol.

14. The method of claim 12 wherein the primary binder further comprises a second component independently selected from the group consisting of: 1,3-propanediol; 1,3-butanediol; 2-methyl-1,3-propanediol; neopentyl glycol; 2,2-diethylpropanediol; 2-ethyl-2-methylpropanediol; 2-methyl-2-propylpropanediol; 2-ethyl-2-butylpropanediol; 2,4-dimethyl-2,4-butanediol; 2,4,4-trimethyl-3,5-pentanediol; 2-ethyl-1,3-hexanediol; 3,3-dimethyl-1,2-butanediol; pinacol; 1,4-cyclohexanediol; trimethylolpropane; di-trimethylolpropane; pentaerythritol; di-pentaerythritol; cyclic trimethylolpropane formal; trimethylolpropane allyl ethers; dipropylene glycol; dipropylene glycol methyl ether; tripropylene glycol; tripropylene glycol methyl ether; triethylene glycol; triethylene glycol methyl ether; triethylene glycol dimethyl ether; tetraethylene glycol; tetraethylene glycol methyl ether; and tetraethylene glycol dimethyl ether.

\* \* \* \* \*